US009245142B2

(12) United States Patent
Aizawa

(10) Patent No.: US 9,245,142 B2
(45) Date of Patent: Jan. 26, 2016

(54) ACCESS CONTROL DATA EDITING SUPPORT DEVICE AND METHOD

(75) Inventor: Taisuke Aizawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 267 days.

(21) Appl. No.: 13/349,674

(22) Filed: Jan. 13, 2012

(65) Prior Publication Data

US 2012/0192267 A1 Jul. 26, 2012

(30) Foreign Application Priority Data

Jan. 26, 2011 (JP) ................................ 2011-014329

(51) Int. Cl.
*H04L 29/06* (2006.01)
*G06F 21/62* (2013.01)

(52) U.S. Cl.
CPC ................... *G06F 21/6218* (2013.01)

(58) Field of Classification Search
CPC ............................. H04L 63/00; G06F 11/00
USPC .......... 726/1–6, 17–19, 27, 30; 709/225, 229, 709/232; 707/648, 672, 687, 694, 705, 783, 707/785, 800
See application file for complete search history.

(56) References Cited

U.S. PATENT DOCUMENTS

| 7,380,267 B2 | 5/2008 | Arai et al. |
| 7,680,813 B2 | 3/2010 | Ushijima |
| 2006/0224597 A1* | 10/2006 | Fitzpatrick et al. ............. 707/10 |
| 2012/0054826 A1* | 3/2012 | Asim et al. ......................... 726/1 |
| 2013/0159021 A1* | 6/2013 | Felsher ............................. 705/3 |

FOREIGN PATENT DOCUMENTS

| JP | 2003-006027 A | 1/2003 |
| JP | 2004-139292 A | 5/2004 |
| JP | 2004-192601 A | 7/2004 |
| JP | 2005-099982 A | 4/2005 |
| JP | 2006-318146 A | 11/2006 |

* cited by examiner

*Primary Examiner* — Joseph P Hirl
*Assistant Examiner* — Leynna Truvan
(74) *Attorney, Agent, or Firm* — Fujitsu Patent Center

(57) ABSTRACT

A computer-readable, non-transitory medium recording an access control data editing support program for causing a computer to implement a procedure. The procedure includes changing log information containing a record having an authorization result of first access authorization determined based on access control data and a content utilized for determining the first access authorization every time an access agent accesses an access target, and changing the access control data based on the changed log information, and determining second access authorization by applying the changed access control data to the content utilized for determining the first access authorization indicated by the log information and generating determination result information containing an authorization result of the second access authorization and a content utilized for determining the second access authorization.

18 Claims, 14 Drawing Sheets

FIG.2

```
<ACL>
<Version>V1.0.0</Version>                                          eV1
<Section value="COMMON 1">
  <ACE>  //ACCESS CONTROL ENTRY                                    eAE1
    <PolicyId> POL008101_20091215001008</PolicyId>  //POLICY ID    ePL1
    <BasePolicyId> * </BasePolicyId>   //ORIGINAL POLICY ID        eBL1
    <Target>"/var/opt/Appl01/workdata"</Target>  //RESOURCE NAME   eT1
    <Process>"Appl01_main",...</Process>  //ACCESS PROCESS LIST    ePS1
    <Action>                                                       eAT1
      <Read>root,...</Read>  //ACCESS ID LIST OR GROUP ID LIST     eR1
      <Control>Permit</Control>  //CONTROL TYPE                    eC1
    </Action>
      :
    <Action>                                                       eAT2
      :
    </Action>
  </ACE>
  <ACE>                                                            eAE2
    :
  </ACE>
</Section>                                                         eS1
<Section value="...">                                              eS2
  :
</Section>
</ACL>
```

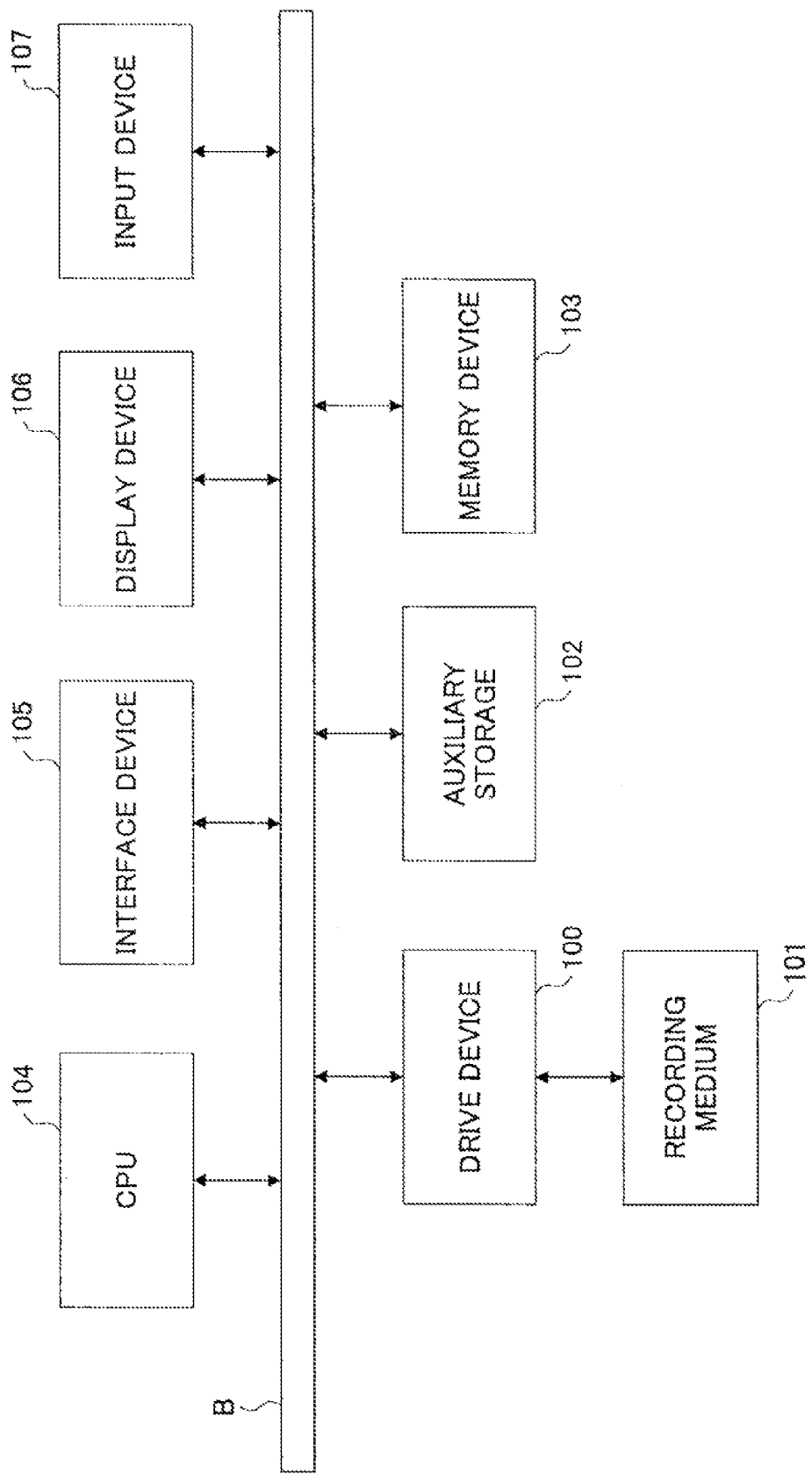

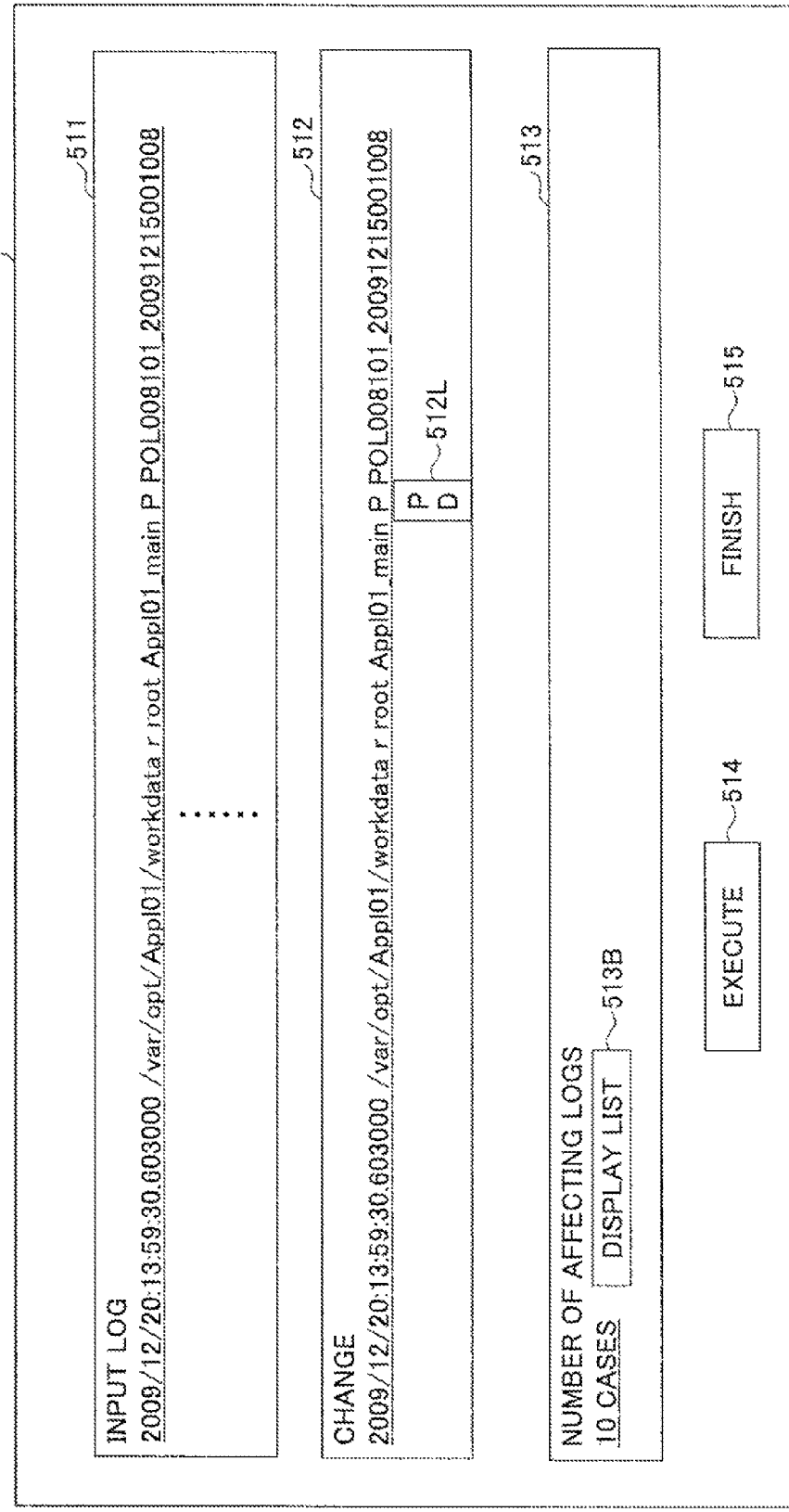

FIG.6A

DATE AND TIME, RESOURCE NAME, ACCESS TYPE, ACCESS ID, ACCESS PROCESS, ACCESS RESULT, POLICY ID

FIG.6B

2009/12/20:13:59:30.603000,"/var/opt/Appl01/workdata",r,root,Appl01_main,P,POL008101_20091215001008

FIG.10

```
<ACE>  //ACCESS CONTROL ENTRY                               ─ eAE1
    <PolicyId> POL00033_20091220151922</PolicyId>           ─ ePL1
    <BasePolicyId> POL008101_20091215001008*</BasePolicyId> ─ eBL1
    <Target>"/var/opt/Appl01/workdata"</Target>             ─ eT1
    <Process>"Appl01_main",···</Process>                    ─ ePS1
    <Action>                                           ┐
        <Read>root</Read>                    ─ eR2    │
        <Control>Deny</Control>              ─ eC2    │ ─ eAT3
    </Action>                                          ┘
    <Action>                                           ┐
        <Read>root,···</Read>                ─ eR1    │
        <Control>Permit</Control>            ─ eC1    │ ─ eAT1
    </Action>                                          ┘
    <Action>                                           ┐
        :                                              │ ─ eAT2
    </Action>                                          ┘
</ACE>
```

| RESOURCE NAME | LINE NUMBER |
|---|---|
| /usr | 1,3,5,··· |
| /usr/bin | ··· |
| /var | ··· |
| : | : |

17b

| USER ID | LINE NUMBER |
|---|---|
| User1 | ··· |
| User2 | ··· |
| Admin | ··· |
| : | : |

17c

| GROUP ID | LINE NUMBER |
|---|---|
| Group1 | ··· |
| Group2 | ··· |
| Group3 | ··· |
| : | : |

17d

| POLICY ID | LINE NUMBER |
|---|---|
| POLxxxxx0 | ··· |
| POLxxxxx1 | ··· |
| POLxxxxx2 | ··· |
| : | : |

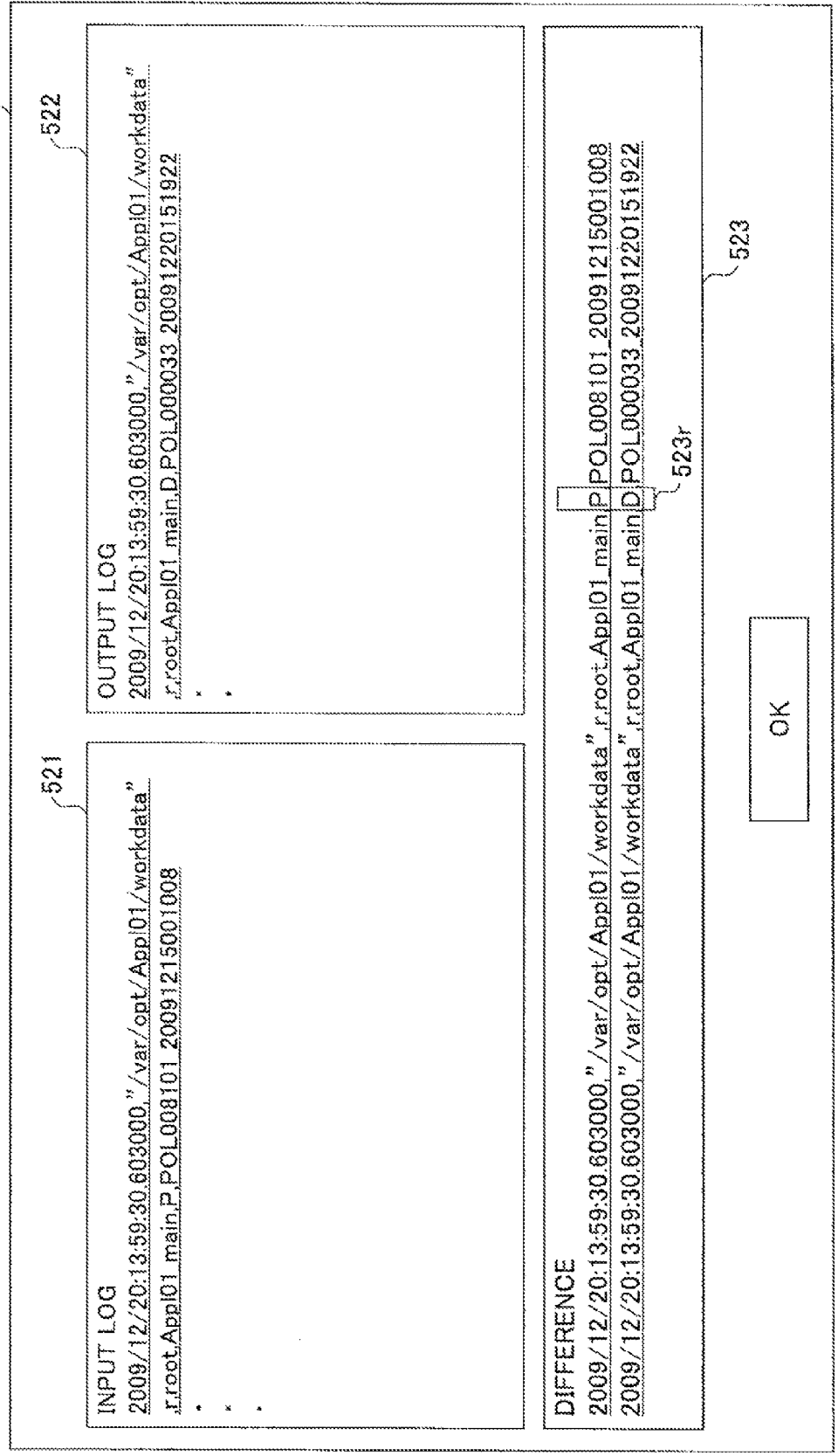

ACCESS CONTROL DATA EDITING SUPPORT DEVICE AND METHOD

CROSS-REFERENCE TO RELATED APPLICATION

This patent application is based upon and claims the benefit of priority of Japanese Patent Application No. 2011-014329 filed on Jan. 26, 2011, the entire contents of which are incorporated herein by reference.

FIELD

The embodiments discussed herein are related to an access control data editing support device, an access control data editing support method and a computer-readable medium storing an access control data editing support program.

BACKGROUND

In computer systems, access to resources such as files is generally controlled based on data containing definitions of access control regulations (hereinafter called "access control data") such as an access control list (ACL). More specifically, the access control data include definitions of accessibility or inaccessibility to various files. When a certain file is accessed by a user, an access control mechanism hooks this user's access to the file. If the access to this file is authorized by comparing credentials to the access control data, the access control mechanism grants the user to access such a file. Note that the access control mechanism referred herein is a uniquely-constructed mechanism independent of those mechanisms provided by the file system in an operating system (OS).

If the access control over the resources (files) is managed based on the access control data, accessible files may need to be specified in the access control data in advance. Thus, it may be important to acknowledge expected new files in advance in order to minimize flaws in the access control security. If new files are created, it may be important to quickly incorporate the newly created files into the access control data as the accessible files.

The related art (e.g., see Patent Document 1 and Patent Document 2) suggests technologies to automatically generate access control data for reducing tasks of editing the access control data when authorizing a user to access the newly created files. More specifically, according to the related art technologies, the access control data for authorizing the user to access the newly created accessible files are automatically generated. Alternatively, according to the related art technologies, the user's attempt to access the newly created files triggers automatic updating of the access control data for authorizing the user to access the newly created accessible files.

In the meantime, the access control data are manually set under a secure operating system (secure OS) environment, based on an access log acquired by the access control mechanism.

[Patent Document 1] Japanese Laid-open Patent Publication No. 2005-99982
[Patent Document 2] Japanese Laid-open Patent Publication No. 2003-6027

SUMMARY

According to an aspect of an embodiment, there exists a computer-readable, non-transitory medium recording an access control data editing support program embodied therein for causing a computer to implement a procedure. The procedure includes changing log information containing at least one record generated for each access to an access target having an authorization result of first access authorization determined based on access control data and a content utilized for determining the first access authorization, and changing the access control data based on the changed log information; and determining second access authorization by applying the changed access control data to the content utilized for determining the first access authorization indicated by the log information, and generating determination result information containing an authorization result of the second access authorization and a content utilized for determining the second access authorization. The content utilized for determining the second access authorization is obtained by applying the changed access control data to the content utilized for determining the first access authorization.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 2 is a diagram illustrating an example of policy data according to an embodiment;

FIG. 3 is a diagram illustrating a hardware configuration example of a policy editing support device according to an embodiment;

FIG. 5 is a diagram illustrating a display example of a log editor screen;

FIGS. 6A and 6B are diagrams illustrating a format of the access log and a specific example of the access log according to an embodiment;

FIG. 10 is a diagram illustrating an example of change in the policy data corresponding to the change made in the input log;

FIG. 12 is a diagram illustrating a configuration example of a log index according to an embodiment that includes four tables;

FIG. 14 is a diagram illustrating a display example of a difference display screen.

DESCRIPTION OF EMBODIMENTS

However, a desired access control result may not necessarily be provided by the automatically generated access control data. Thus, the automatically generated access control data may be manually corrected, and a test is conducted for verifying the validity of the corrected access control data under a simulated practical operating environment. However, conducting a single test for verifying the validity of the corrected access control data does not generally provide a satisfactory access control result. Thus, the automatically generated access control data may need to be repeatedly corrected and the testing of the validity of the corrected access control data are repeatedly carried out until a satisfactory access control result is obtained.

The repeated correction and corresponding tests may extensively increase working hours. In addition, correcting the access control data manually may further increase working hours, due to inaccurate settings and misjudgment of affecting areas.

Figure 1:
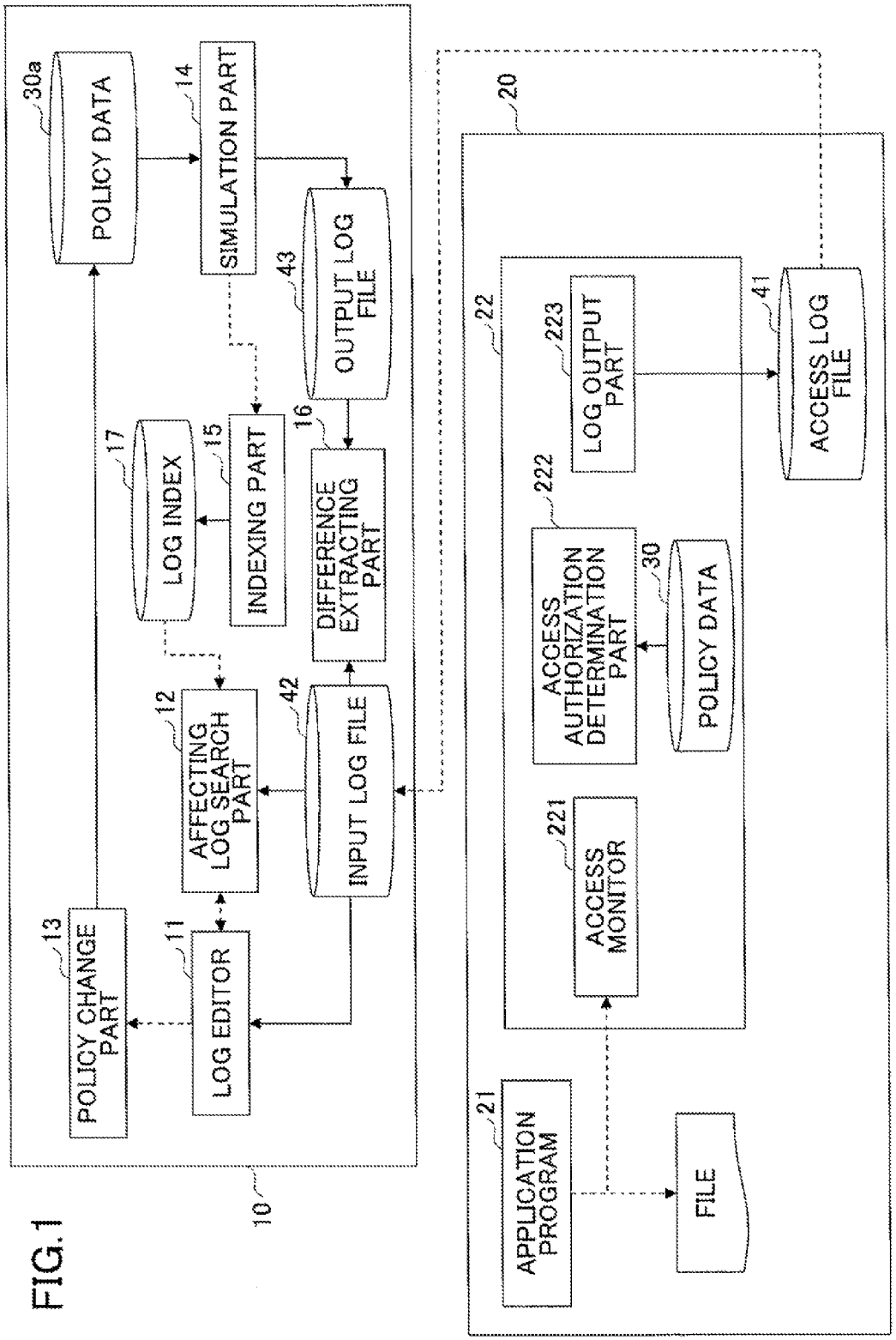
FIG. 1 is a diagram illustrating a functional configuration example of a policy editing support system according to an embodiment.

A description is given, with reference to the accompanying drawings, of embodiments. FIG. 1 is a diagram illustrating a functional configuration example of a policy editing support system according to an embodiment. In FIG. 1, a policy editing support device 10 and an access control device 20 are connected via a local area network (LAN) or a network such as the Internet, such that the policy editing support device 10 and the access control device 20 are in communication with each other via the network.

The access control device 20 is a computer configured to determine whether to authorize an access (operating) agent to have access to resources (an access target). In this embodiment, a file generated on the file system is illustrated as a specific example of the resources that are utilized as the access target (or access control target). Thus, the "access" or "accessibility" in this embodiment indicates accessibility to such a generated file in the file system. Further, a specific example of the access agent in this embodiment indicates a user or a group identified by a user ID or a group ID. The group in this embodiment indicates a concept that expresses collective users as one entity of an agent in the access control. Note that a specific content of the resources, the access agent or the access itself may be appropriately changed based on a computer system to which the embodiments are applied.

In FIG. 1, the access control device 20 includes an application program 21 and an access control part 22. The application program 21 is an example of a set of programs that realize the access to a target file (i.e., access target) based on an instruction given by the user (i.e., access agent).

The access control part 22 is independent of an access control mechanism in the file system in an operating system (OS). The access control part 22 is configured to detect (hook) the access to the target file realized by the application program 21 and determine whether to authorize the user's such access to the target file. The access control part 22 includes an access monitor 221, an access authorization determination part 222, a log output part 223 and policy data 30.

The access monitor 221 is configured to monitor the access to the target file realized by the application program 21. Note that the monitoring method employed in the embodiment may be any monitoring methods disclosed in the related art. On detecting the access to the target file realized by the application program 21, the access monitor 221 inputs an identifier of the application program 21, an identifier of the user (operator/access agent) of the application program 21, a file name of the target file (i.e., access target) and an access type into the access authorization determination part 222.

The access authorization determination part 222 is configured to determine whether to authorize the detected access by applying the aforementioned input information to the policy data 30. If the access to the file is authorized by the access authorization determination part 222, the user (operator) is allowed to have the access to the target file. If, on the other hand, the access to the target file is rejected (unauthorized) by the access authorization determination part 222, the user (operator) is not allowed to have the access to the target file. The policy data 30 are an example of the access control data that include settings and definitions of the access authorization based on a combination of the access agent, the access target (the resources) and the access type (operating type).

FIG. 2 is a diagram illustrating an example of the policy data 30 according to an embodiment. As illustrated in FIG. 2, the policy data 30 according to the embodiment are written in an extensible markup language (XML) format. Note that XML related terminology may be utilized for illustrating contents of the policy data 30. For example, a "XXX element" indicates a part surrounded by <XXX>tags.

In the policy data 30, an "ACL" element (see <ACL> in FIG. 2) is a root element. The "ACL" element includes a "Version" element and at least one "Part" element as child elements. In FIG. 2, the "ACL" element includes the "Version" element eV1, and the "Part" elements eS1 and eS2.

The value of the "Version" element indicates a version of the policy data 30. The "Part" element indicates a grouping range of the definition contents within the "Part" (e.g., application name). Since the policy data utilized for the access control provide requirement definitions of access authorization to the access target (i.e., the target file), the policy data for the general-purpose applications having identical file configurations may be shared between the different systems. The "Part" element is utilized for each grouping per the application unit. The attribute value of the "Part" element indicates an identification name or an identifier of the grouping range. For example, the attribute value of the "Part" element eS1 is "common 1" as illustrated in FIG. 2. Thus, the definition content of the "Part" element eS1 is managed as a policy group in a system to which the application identified by the "common 1" is introduced. Note that if there is no need to collectively manage plural access authorization requirements, the "Part" element may be unnecessary. In this case, the later-described child elements of the "Part" element may be written as the child elements of the "ACL" element.

Each "Part" element includes at least one "ACE" element as a child element. For example, the "Part" element eS1 includes the "ACE" elements eAE1 and eAE2. The "ACE" element in this embodiment may be called an "access control entry". The access control entry corresponds to a minimum unit entry in the definitions relating to the access control. Thus, the policy data 30 includes at least one "ACE" element.

The "ACE" element includes a "Policy Id" element, a "Base Policy Id" element, a "Target" element, a "Process" element and at least one "Action" element as child elements. For example, the "ACE" element eAE1 includes the "Policy Id" element ePL1, the "Base Policy Id" element eBL1, the "Target" element eT1, the "Process" element ePS1 and the "Action" elements eAT1 and eAT2.

The value of the "Policy Id" element indicates a policy ID. The policy ID is a unique identifier assigned for each access control entry. The "Base Policy Id" element is a policy ID of a source (an original version) before the "ACL" element (access control entry) is changed. The source of the (changed) "ACL" element indicates an original "ACL" element before the "ACL" element is automatically changed by the policy editing support device 10. Thus, the "change" in this context indicates an automatic change. Note that the value of the "Base Policy Id" element eBL1 is "*" in FIG. 2. This "*" indicates that there is no (original) source of the access control entry (i.e., the "ACE" element eAE1). That is, the access control entry illustrated in FIG. 2 indicates a first version.

The value of the "Target" element indicates a name (i.e., a file name) of the access target (i.e., resources) to which the access control entry is applied. The "Process" element indicates a list of the names of the application program 21 (formed of a set of programs) to which the access control entry is applied. That is, the name of at least one program of the application program 21 may be specified in the "Process" element.

The "Action" element defines contents of the controls relating to the access to the resources (files) specified in the "Target" element. The "Action" element includes a "Read" element, a "Write" element, a "Create" element, a "Delete" element, a "Name" element, an "Attribute" element, a "Start" element, or other elements in compliance with access rights such as a "Terminate" element, and a "Control" element as child elements. For example, the "Action" element eAT1 includes a "Read" element eR1 and a "Control" element eC1.

The value of the "Read" element indicates an ID of an agent (i.e., user or group) subject to control over referring (reading or loading) of the access target. The value of the "Write" element indicates an ID of an agent subject to control over writing (recording) an access target. The value of the "Create" element indicates an ID of an agent subject to control over creating an access target. The value of the "Delete" element indicates an ID of an agent subject to control over deleting the access target. The value of the "Name" element indicates an ID of an agent subject to control over changing a name (file name) of the access target. The value of the "Attribute" element indicates an ID of an agent subject to control over changing an attribute value of the access target. The value of the "Start" element indicates an ID of an agent subject to control over starting (activating) operation on the access target. The value of the "Terminate" element indicates an ID of an agent subject to control over terminating (deactivating) operation on the access target.

User IDs and group IDs may be specified for the respective values of the elements in compliance with access rights. If the access types other than those described above are desired to be controlled, additional elements may be defined based on such access types.

The value of the "Control" element indicates an access control type when access relating to the elements in compliance with access rights has been attempted. In this embodiment, the access control type includes "Permit" or "Deny". The "Permit" indicates permission or acceptance. The "Deny" indicates denial or rejection.

Accordingly, the "ACE" element eAE1 includes a definition of allowing (authorizing) a root user to refer to a (target) file named "/var/opt/App101/workdata" as illustrated in FIG. 2.

Note that FIG. 2 illustrates only one example. The policy data 30 may be written other than in the XML format but may be defined by other structures.

Referring back to FIG. 1, the log output part 223 outputs (records) a content used by the access authorization determination part 223 for determining access authorization and a log(an access log) including a result of the access authorization determination (i.e., an access result) to the access log file 41. The log output part 223 outputs one line access log for each access.

Thus, the access control device 20 actually performs access control over files in a practical operation. Note that the computer containing the application program 21 having the set of programs or the files may be provided separately from the access control device 20. The policy data 30 may be stored in storage connected to the access control device 20 and the network. Further, the access log file 41 may be generated (output) in storage connected to the access control device 20 and the network.

The policy editing support device 10 is a computer configured to support an editing task when the policy data 30 utilized by the access control device 20 is desired to be edited.

The policy editing support device 10 includes a log editor 11, an affecting log search part 12, a policy change part 13, a simulation part 14, an indexing part 15 and a difference extracting part 16. The difference extracting part 16 is an example of a difference extracting unit. These functions may be implemented by causing a CPU (i.e., later-described CPU 104) of the policy editing support device 10 to execute programs installed in the policy editing support device 10.

The log editor 11 is configured to edit (change) the input log file 42 based on instructions for editing the input log file 42 input by the user (e.g., an administrator). The input log file 42 is a copy of the access log file 41 transferred from the access control device 20. The input log file 42 is an example of log information. An example of editing the input log file 42 includes changing an access log indicating that a user A is unauthorized to write data on a file "a" into an access log indicating that the user A is authorized to write data on the file "a". That is, the access log may be changed into another access log indicating the access control result desired by the administrator by editing the input log file 42.

The policy change part 13 is configured to apply parameters (change) assigned to the input log file 42 to a policy data 30a. An initial state of the policy data 30a is the same as an initial state of the policy data 30 in the access control device 20. That is, the policy data 30a without having any change that is distributed to or delivered to the access control device 20 may correspond to the policy data 30.

Thus, in this embodiment, the user does not directly edit the policy data 30a that is an ultimate editing target but edits the input log file 42. Specifically, part of the policy data 30a is reversely generated based on the edited input log file 42. Note that in this embodiment, the log editor 11 and the policy change part 13 represent an example of a change unit.

The simulation part 14 is configured to perform an access control simulation based on the policy data 30a. Note that the term "simulation" is utilized for illustrating the embodiment because the access control performed by the simulation part 14 is not the actual access control performed over the access to the files. That is, the simulation part 14 generates pseudo-access generated in the operating environment in the past recorded in the input log file 42. The simulation part 14 performs the access control over the generated pseudo-access.

Specifically, the simulation part 14 applies access contents (contents utilized for access authorization determination) of the respective access logs recorded in the input log file 42 to the policy data 30a and determines the authorization of each access (access authorization). The simulation part 14 outputs (records) an access log containing the access content and the result of the access authorization to the output log file 43. The access log output by the simulation part 14 is hereinafter called an "output log". The output log is an example of determination result information. In addition, the simulation part 14 is an example of a generator.

As described above, the simulation part 14 executes a process (logic) approximately similar to the processes performed by the access authorization determination part 222 and the log output part 223. In practice, it is preferable that the simulation part 14 execute the process utilizing software modules common to those of the access authorization determination part 222 and the log output part 223. Note that the access control device 20 and the policy editing support device 10 may be implemented in the same computer. In such a case, it is preferable that the software modules be shared by the simulation part 14, the access authorization determination part 222 and the log output part 223.

The indexing part 15 is an example of an index recording unit. The indexing part 15 is configured to index the output log(record index data of the output log) output by the simulation part 14. That is, the indexing part 15 records information on the access target and the access agent associated with the output log in the log index 17 every time the simulation part 14 outputs the output log to the output file 43. The log index 17 is an example of an index storage unit.

The difference extracting part 16 is configured to extract a difference between the input log file 42 and the output log file 43 and display the extracted difference.

If the user is satisfied with the displayed difference, the editing task of the policy data 30a (i.e., editing task of the input log file 42 from the user's point of view) is terminated. If, on the other hand, the user is dissatisfied with the displayed difference, that is, if the output log exhibits an undesired result, the output log file 43 is treated as a new input log file 42, so that the log editor 11 edits the new input log file 42 (e.g., see step S102 in FIG. 4), and processes subsequent to the editing the input log file 42 are repeatedly carried out (e.g., steps S103 to S109 in FIG. 4).

Note that the log index 17 is generated when the log editor 11 edits the input log file 42 (i.e., the output log file 43 is treated as the input log file 42) from the second time onward. The simulation process performed by the simulation part 17 may be accelerated from the second time onward by utilizing the log index 17.

The affecting log search part 12 is configured to search for input logs liable to be affected by the editing (change) of the input log file 42 by utilizing the log index 17 when the log editor 11 edits the input log file 42 from the second time onward.

FIG. 3 is a diagram illustrating a hardware configuration example of a policy editing support device 10 according to an embodiment. As illustrated in FIG. 3, the policy editing support device 10 includes a drive device 100, an auxiliary storage 102, a memory device 103, a CPU 104, an interface device 105, a display device 106 and an input device 107, which are mutually connected via a bus B.

A computer program that implements various processes in the policy editing support device 10 is provided with a recording medium 101 such as a CD-ROM. When the recording medium 101 storing the computer program is placed in the drive device 100, the computer program is installed in the auxiliary storage 102 from the recording medium 101 via the drive device 100. Note that the compute program may not necessarily be installed from the recording medium 101, but may be installed by downloading it from other computers via the network. The auxiliary storage 102 stores necessary files, data, and the like while storing the installed computer program.

On receiving an activating computer program instruction, the memory device 103 retrieves the computer program from the auxiliary storage 102 and loads the retrieved computer program. The CPU 104 executes the computer program having instructions loaded on the memory device 103 to implement the functions (or procedure) of the policy editing support device 10. The interface device 105 is utilized as an interface for connecting the policy editing support device 10 to the network. The display device 106 displays a graphical user interface (GUI) based on the computer program. The input device 107 includes a keyboard and a mouse via which various operational instructions are input into the policy editing support device 10.

Figure 4:
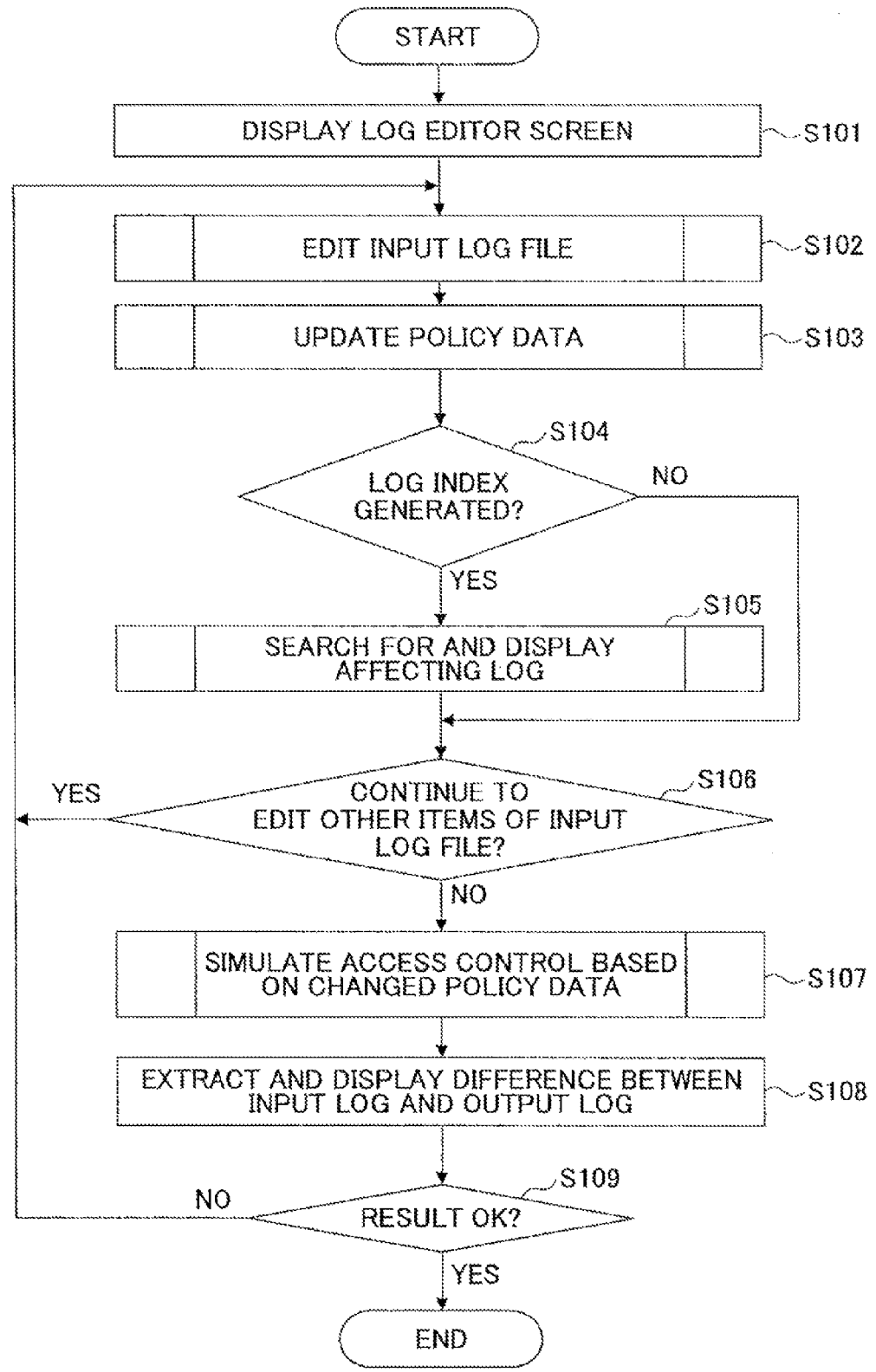
FIG. 4 is a flowchart illustrating an example of an overall process carried out by the policy editing support device.

A process performed by the policy editing support device 10 is described below. FIG. 4 is a flowchart illustrating an overall process carried out by the policy editing support device 10. At the start of the process in FIG. 4, the access log file 41 recorded in the access control device 20 is copied and stored as the input log file 42 in the auxiliary storage 102 of the policy editing support device 10 (see FIG. 1). In addition, the policy data 30 utilized in the access control device 20 is stored as the policy data 30a in the auxiliary storage 102 of the policy editing support device 10 (see FIG. 1).

For example, when the user specifies an input log file 42 and inputs editing instructions for editing the policy data 30, the log editor 11 displays a log editor screen on the display device 106 (step S101).

FIG. 5 is a diagram illustrating a display example of the log editor screen 510. As illustrated in FIG. 5, the log editor screen 510 includes a log editor screen 510, a log display area 511, a log editor area 512, an affecting log display area 513, an execute button 514 and a finish button 515.

In step S101, a list of access logs contained in the input log file 42 subject to editing is displayed in the log display area 511 in step S101. The access log contained in the input log file 42 are loaded on the memory device 103 by the log editor 11.

FIGS. 6A and 6B are diagrams illustrating a format of the access log and a specific example of the access log according to an embodiment. FIG. 6A illustrates the format of the access log. In FIG. 6A, a line of the access log includes values corresponding to items including date and time, a resource name, an access type, an access ID, an access process, an access result, and a policy ID, which are recorded in a comma separated values (CSV) format.

The date and time indicates date and time at which an access is attempted. The resource name indicates a name of the resources (i.e., a file name) defined as the access target. The access type indicates an attempted access type, which is referring (r), writing (w), creating (c), deleting (d), renaming (n), re-attributing (a), starting (s), terminating (t) or the like. Note that the letters in brackets indicate values recorded in an access log. The access ID indicates an ID of the access agent (i.e., a user ID or a group ID). The access process indicates a name of the application program 21 utilized for the access to resources. The access result indicates a result (i.e., permitted (P) or denied (D)) of the access control. The policy ID indicates a policy ID of the access control entry (i.e., the "ACE" element) applied.

FIG. 6B illustrates the specific example of the access log. As illustrated the specific example of FIG. 6B, the date and time indicates "2009/12/20:13:59:30.603000", the resource name indicates "/var/opt/App101/workdata", the access type indicates "r (referring)", the access ID indicates "root", the access process indicates "App101_main", the access result indicates "P (permitted)", and the policy ID indicates "POL008101_20091215001008".

Note that the access log contained in the input log file 42 is hereinafter called an "input log".

Note that the log editor area 512, the affecting log display area 513, the execute button 514 and the finish button 515 illustrated in FIG. 5 will be described later.

In FIG. 5, examples of contents displayed in the log editor area 512 and the affecting log display area 513 are illustrated; however, the log editor area 512 and the affecting log display area 513 are blank (empty) in step S101.

Subsequently, the log editor 11 executes an editing process on the input log file 102 based on instructions input by the user (step S102). The editing process result indicates that the input log file 42 contains an access control result desired by the user. Note that one of items of the input log file 42 (i.e., one of the items of the input log) is edited in step S102.

Subsequently, the policy change part 13 updates (changes) the policy data 30a based on the edited result of the input log performed by the log editor 11 (step S103).

Subsequently, the affecting log search part 12 verifies whether the log index 17 corresponding to the input log file 42 is generated in the auxiliary storage 102 (step S104). If the log index 17 is generated in the auxiliary storage 102 ("YES" in step S104), the affecting log search part 12 searches for any input logs liable to be affected by the editing process instep S102 utilizing the log index 17 (step S105). The affecting log search part 12 displays the searched result in the affecting log display area 513 of the log editor screen 510. Note that "being affected" indicates a change in the access result. That is, the policy data 30a that is changed based on one of the items of the input log may change (affect) associated access results contained in other input logs.

If, on the other hand, the log index 17 corresponding to the input log file 42 is not generated in the auxiliary storage 102 ("NO" in step S104), a step S106 is carried out by skipping a step S105. Since the log index 17 is generated in step S107, the step S105 may not be carried out until the access control simulation is carried out in step S107.

If the user continues to edit other items of the input log file 42 ("YES" in step S106), steps S102 to S103 or steps S102 to S105 are repeatedly carried out. When the editing (change) of the input log file 42 is complete and the user clicks an execute button 514 ("NO" in step S106), the simulation part 14 performs the access control simulation based on the policy data 30a (step S107). Specifically, the simulation part 14 applies the access contents of the respective access logs recorded in the input log file 42 to the policy data 30a and determines whether to authorize (permit) the access to the access target (the access file in question). The simulation part 14 outputs an output log containing the access content and the result of the access authorization to the output log file 43.

Subsequently, the difference extracting part 16 extracts a difference between the input log file 42 and the output log file 43 and display the extracted difference on the display device 106 (step S108).

If the user is dissatisfied with the displayed difference, that is, if the output log contains an undesired result, the user continues to edit the policy data 30a in the log editor screen 510. Thus, processes subsequent to step S101 are repeatedly carried out in this case.

If, on the other hand, the user is satisfied with the displayed difference, the user clicks the finish button 515. When the log editor 11 detects the click of the finish button 515 ("YES" in step S109), the process of FIG. 4 is terminated. The policy data 30a acquired at this time is suitable for the access control desired by the user. Accordingly, the policy data 30a acquired at this time is distributed to the access control device 20 and the distributed policy data 30a is utilized as the policy data 30 in the access control under the practical operation.

Figure 7:
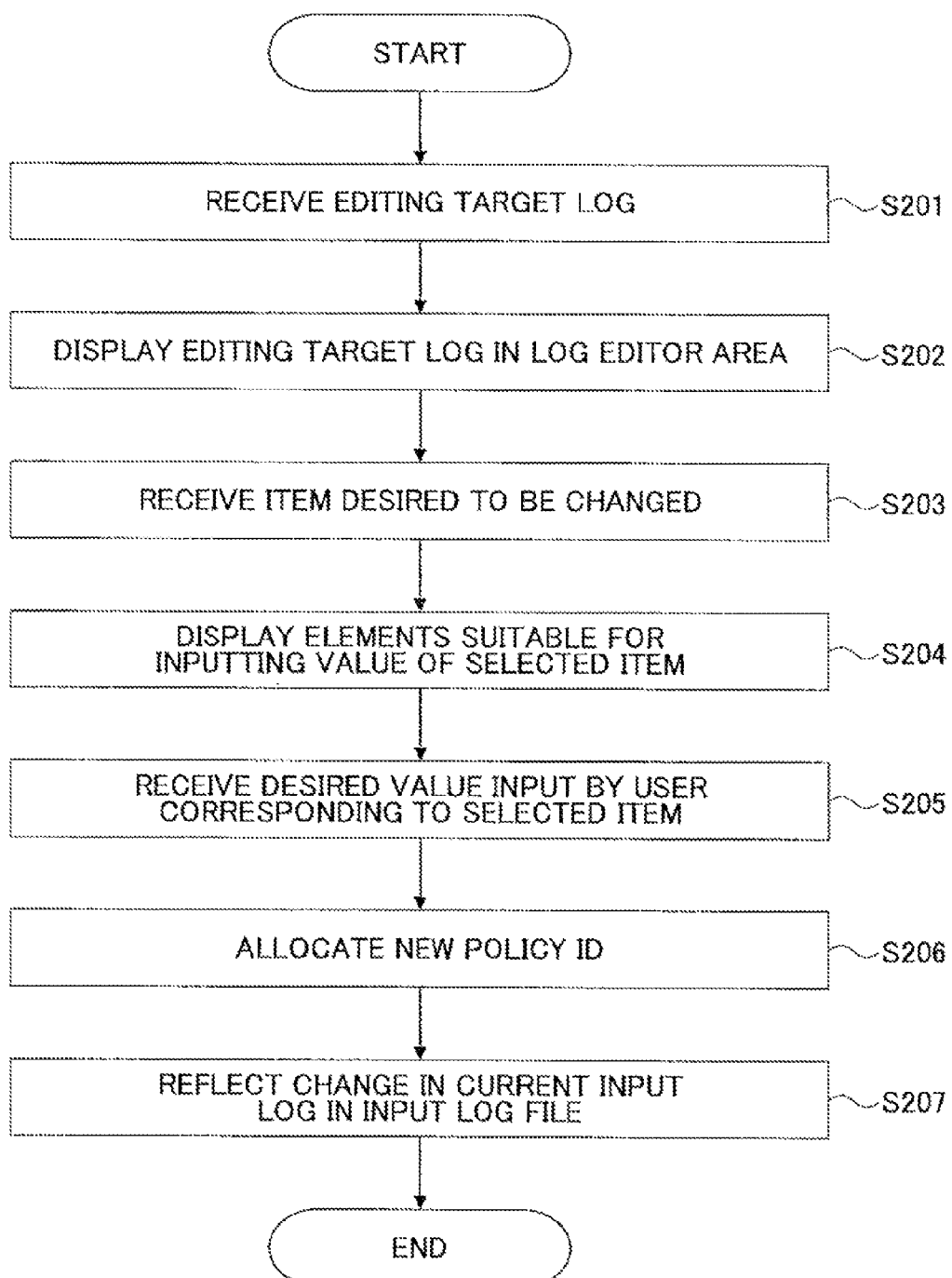
FIG. 7 is a flowchart illustrating an example of an input log file editing process.

Next, a detail of step S102 in FIG. 4 is described. FIG. 7 is a flowchart illustrating an example of an input log file editing process.

When one (i.e., one line) of the input logs is selected as an editing target in the log display area 511 of the log editor screen 510 based on the user's instruction (step S201), the log editor 11 displays the selected input log in the log editor area 512 (step S202). Note that the input log displayed in the log editor area 512 illustrated in FIG. 5 is the same as the input log displayed in the log editor area 512 illustrated in FIG. 6B.

Subsequently, an item desired to be changed is selected from the input log(hereinafter called "current input log") displayed in the log editor area 512 based on the user's instructions (step S203). For example, a string of the item desired to be changed is selected from the current input log by clicking. Subsequently, the log editor 11 displays display elements suitable for inputting a value of the selected item (step S204). That is, if the value of the item is selective, a list of or check boxes, from which the values of the corresponding item are selected, are displayed for the user to select one of the alternatives (i.e., desired value). By contrast, if the value of the item is relatively free for the user to input the value using a string of characters, display elements suitable for inputting the string of characters are displayed. FIG. 5 illustrates an example in which the value "P" (permitted) is selected for the access result item in the log editor area 512. In this example, "P" or "D" is selectable for the access result item. Thus, a list 512L is displayed for the user to select "P" (permitted) or "D" (denied) for the access result item.

Further, if the resource name item is selected, display elements for editing the file path are displayed. Alternatively, a file dialog may be displayed. If the access type item is selected, check boxes corresponding to the access types are displayed for the user to select the access types. In this case, the check boxes are suitable for the user to select a combination or combinations of the access types. Further, the access ID item is selected, a list of user IDs or group IDs recorded in the input log file 42 is displayed. The list of the user IDs or the group IDs may be the one similar to the user management DB stored in the storage. Alternatively, display elements for the user to input a string of characters corresponding to the user ID or the group ID may be displayed. If the access process item is selected, check boxes corresponding to the existing application programs 21 for the user to select one or more of the existing application programs 21 or display elements for the user to input names of the desired application programs 21 are displayed. If the date and time item is selected, selection of weekday, holiday, within predetermined time (e.g., opening hours) or overtime are displayed for the user to select one of the alternatives. The policy data 30 according to the embodiment include no element for restricting time for the access control. However, the policy data 30 according to the embodiment may define an element for restricting time for the access control. If the policy data 30 according to the embodiment is capable of defining such an element for restricting time for the access control, the policy change part 13 may set the value selected from the above-described alternatives corresponding to the element for restricting time for the access control.

Note that the log editor area 512 may be used as a text editor for the user to directly edit text in the log editor area 512.

Subsequently, the log editor 11 receives a desired (expected) value selected or input by the user corresponding to the selected item (step S205). Subsequently, the log editor 11 allocates a new policy ID (S206). Then, the log editor 11 reflects the change made in the current input log in the input log file 42 read in the memory device 103 (step S207). Specifically, a line of the current input log in the input log file 42 is replaced with the log displayed in the log editor area 512 illustrated in FIG. 5. When the current input log is replaced with the log displayed in the log editor area 512 illustrated in FIG. 5, the displayed content of the current input log displayed in the log display area 511 is also changed into the log displayed in the log editor area 512 illustrated in FIG. 5. At this moment, the value of the policy ID of the current input log is replaced with a new one. Note that the previous policy ID is retained in the memory device 103.

Figures 8A, 8B:
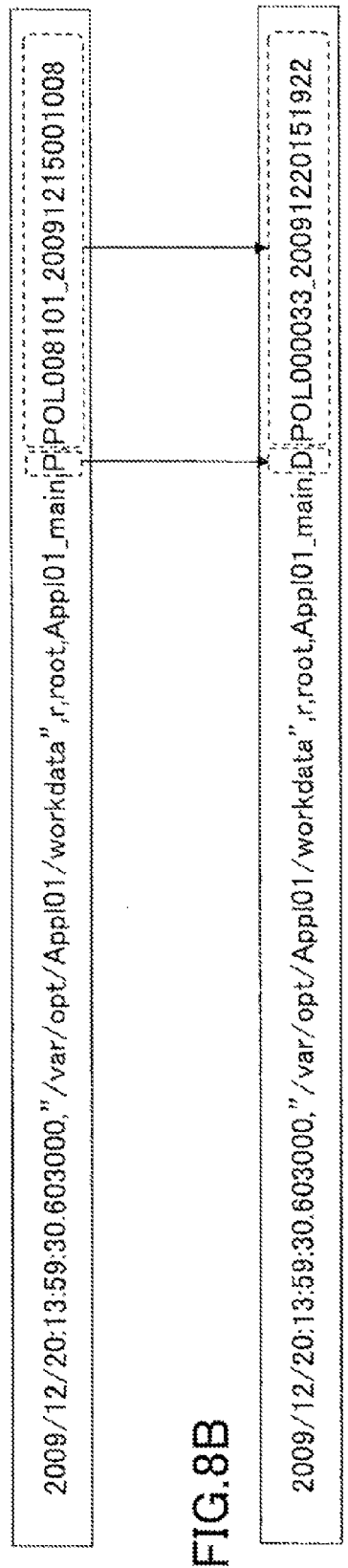
FIGS. 8A and 8B are diagrams illustrating an example of change made in an input log.

For example, if "D" (denied) is selected in the list 512L illustrated in FIG. 5, the current input log is changed into the one illustrated in FIG. 8B.

FIGS. 8A and 8B are diagrams illustrating an example of the input log when the input log is changed. FIG. 8A illustrates the input log before the input log is changed and FIG. 8B illustrates the input log after the input log is changed. As illustrated in FIG. 8B, the value of the access result item is changed from "P" (permitted) into "D" (denied). In this example illustrated in FIGS. 8A and 8B, the user (administrator) desires to change the authorized (permitted) root user's access to the file "/var/opt/App101/workdata" into an unauthorized access to that file (denied). In this example, the value of the policy ID item is also changed. Specifically, the value of the policy ID in FIG. 8B is replaced with a new policy ID allocated in step S206.

Figure 9:
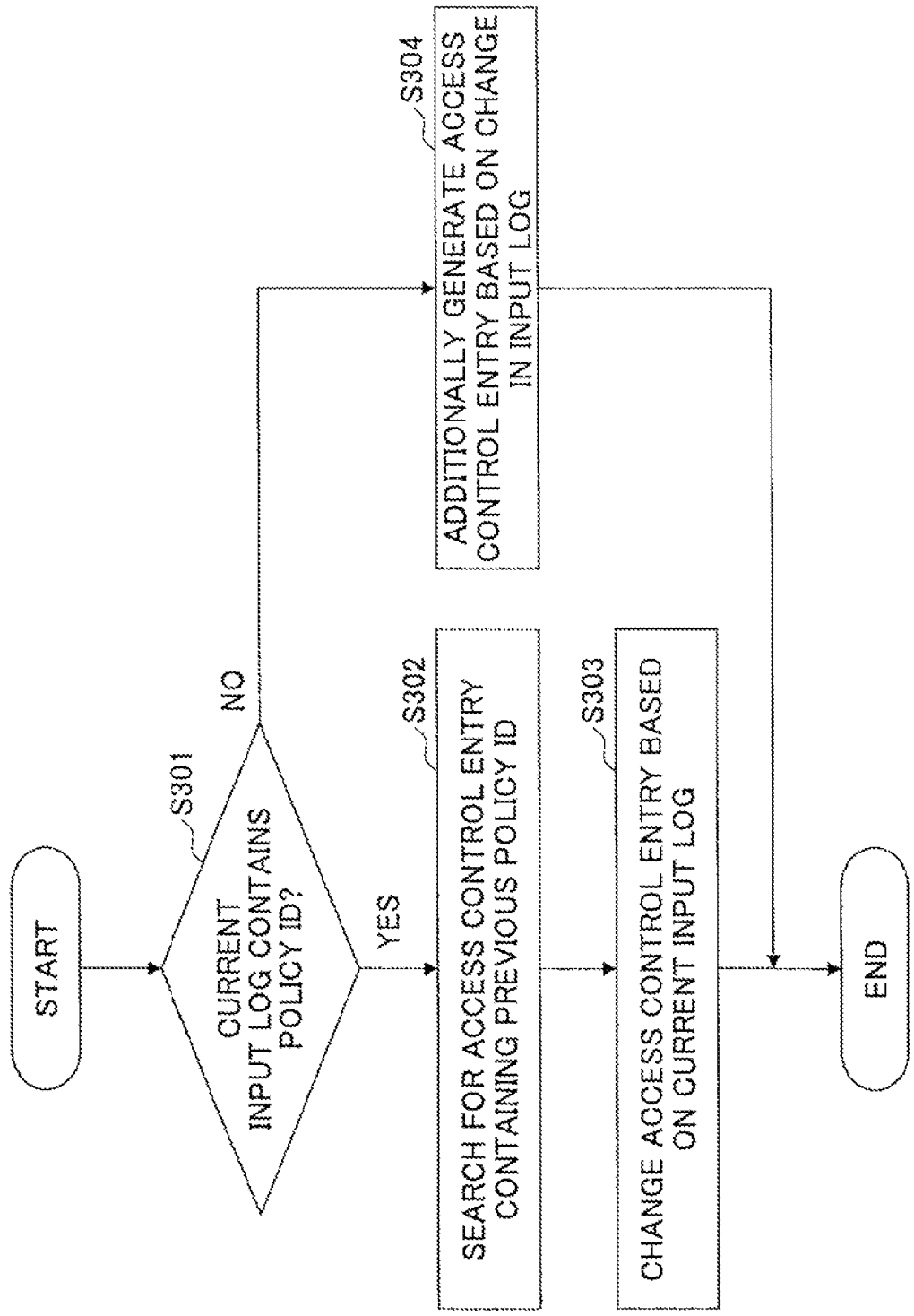
FIG. 9 is a flowchart illustrating an example of a policy data updating process.

Next, a detail of step S103 in FIG. 4 is described. FIG. 9 is a flowchart illustrating an example of a policy data updating process.

In step S301, the policy change part 13 determines whether the changed input log(i.e., current input log) contains the policy ID (step S301). If the current input log contains the policy ID ("YES" in step S301), the policy change part 13 searches for the access control entry (the "ACE" element) containing the policy ID (previous policy ID) before change in the input log in the policy data 30a (step S302). The current input log(changed input log) containing the previous policy ID indicates that the current input log contains the value of the "Policy id" element or the "Base Policy Id" element as the previous policy ID. That is, the current input log contains not the value of the current policy ID (new policy ID) but the value of the previous policy ID (old policy ID), and hence the access control entry (the "ACE" element) containing the value of the previous policy ID is found by the search conducted in step S302. However, there is one "ACE" element (access control entry) that is searched for. That is, the policy ID is uniquely allocated for each "ACE" element and each update (each generation).

Subsequently, the policy change part 13 changes the searched access control entry ("ACE" element) based on the change in the current input log(step S303). For example, if the input log is changed as illustrated in FIGS. 8A and 8B, the "ACE" element eAE1 (see FIG. 2) having a policy ID that matches the previous policy ID (i.e., policy ID before the input log is changed) into the "ACE" element eAE1 illustrated in FIG. 10.

FIG. 10 is a diagram illustrating an example of change in the policy data corresponding to the change made in the input log. In FIG. 10, the "ACE" element eAE1 in FIG. 2 is selectively illustrated. Elements illustrated in FIG. 10 similar to those illustrated in FIG. 2 are provided with the same reference numerals and descriptions of such elements are thus omitted.

As illustrated in FIG. 10, the "ACE" element eAE1 additionally includes an "Action" element eAT3 as a new child element. The "Action" element eAT3 is a new "Action" element added based on the change in the input log illustrated in FIGS. 8A and 8B. The "Action" element eAT3 includes a "Read" element eR2 and a "Control" element eC2. As illustrated in FIG. 10, the value of the "Read" element eR2 is "root". The value of the "Control" element eR2 is "Deny". Accordingly, the "Action" element eAT3 does not allow the root user to refer to the access target (file). The content of the Action" element eAT3 is consistent with the content of the input log illustrated in FIG. 8B.

Further, in FIG. 10, the "Policy Id" element ePL1 includes a newly allocated policy ID (i.e., new value of the policy ID).

Further, the previous value of the "Policy Id" element ePL1 is added as a value of the "Base Policy ID" element eBL1.

Note that the value of the "Action" element eAT1 remains unchanged in FIG. 10. That is, the "root" remains unchanged as the value of the "Read" element eR1. This is because a definition appearing earlier has priority over a definition appearing later in the policy data 30 according to this embodiment. Specifically, the "Action" element eAT3 has priority over the "Action" element eAT1 in FIG. 10. Accordingly, the newly "Action" element eAT3 is added before the existing "Action" element eAT1 (above the existing "Action" element eAT1 in FIG. 10), such that the "Action" element eAT3 has priority over the "Action" element eAT1. Note that the value "root" may be deleted from the "Read" element eR1. In this case, even if the priority is given to the definition appearing earlier over the definition appearing later, the newly "Action" element eAT3 may be added after the existing "Action" element eAT1.

Thus, the access result change made in the input log is reflected as the additional "Action" element in the policy data 30a.

Note that if the resource name of the input log is changed, the value of the "Target" is changed. If the access type of the input log is changed, a new "Action" element having an element of a new access type (changed access type) as a child element is added. For example, if the value of the access type in the input log is changed from "r" (read) to "w" (write), a new "Action" element having a "Write" element as a child element is added. The value of the "Write" element is in compliance with the value of the access ID of the input log. The value of the "Control" element, which is a child element of the "Action" element, is in compliance with the value of the access result of the input log.

If the access ID of the input log is changed, the value of the elements related to the access type (e.g., "Read" element) are changed. The elements related to the access type are the child elements of the "Action" element corresponding to the previous access ID, access type and access result. If the access process of the input log is changed, the value of the "Process" is changed.

If, on the other hand, the current input log contains no policy ID ("NO" in step S301), the policy change part 13 generates a new access control entry (the ACE element) that represents content of the resource name, the access type, the access ID, the access process and the access result of the changed current input login the policy data 30a (step S304). In this case, the "ACE" element includes a new policy ID. Note that if the current input log contains no policy ID, the access log output by the log output part 223 may not contain the policy ID in view of performance in operation.

The processes illustrated in FIGS. 7 and 9 are repeatedly carried out by the user's repeatedly editing of the input log via the log editor screen 510. As a result, the policy data 30a accumulates the changed elements.

Figure 11:
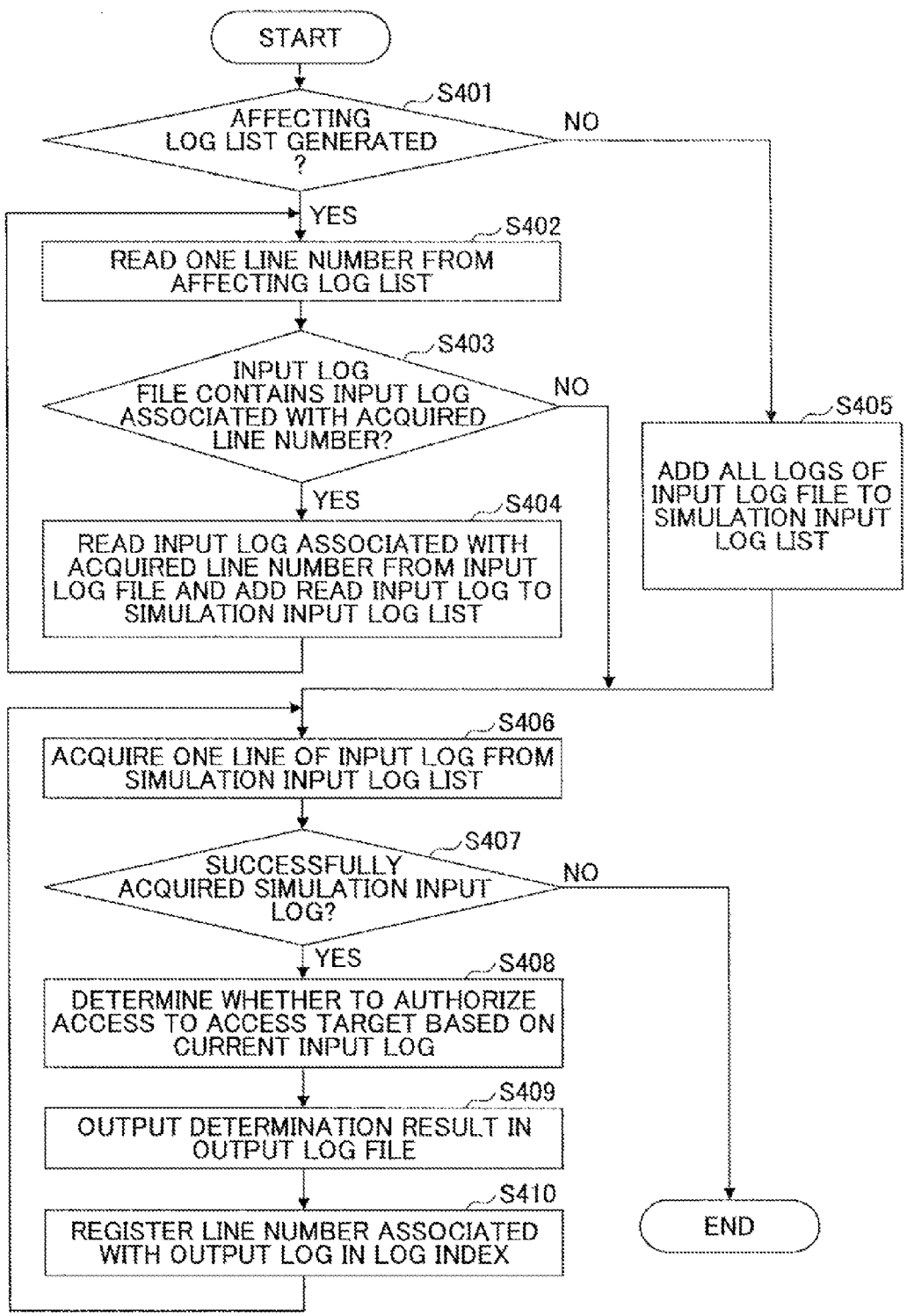
FIG. 11 is a flowchart illustrating an example of a simulation process for simulating access control based on the changed policy data.

Next, a detail of step S107 in FIG. 4 is described. FIG. 11 is a flowchart illustrating an example of a simulation process for simulating access control based on the changed policy data.

In step S401, the simulation part 14 determines whether an affecting log list is generated. The affecting log list indicates a list to be generated when the step S105 in FIG. 4 is executed. That is, the affecting log list is generated every time the process of FIG. 11 is executed. Thus, a case where the affecting log list is not generated ("NO" in step S401) is described below.

If the affecting log list is not generated ("NO" instep S401), the simulation part 14 selects all the input logs recorded in the changed input log file 42 as a simulation target (step S405). The list of the input logs selected as the simulation target is hereinafter called "simulation input log list". Note that contents of the simulation input log list are initialized (blank) at the start of the process of FIG. 11.

Subsequently, the simulation part 14 acquires one line of the input log from the simulation input log list (step S406). In this case, the input log is acquired in the order of from top line to bottom line of the simulation input log list. If the simulation part 14 successfully acquires the line of the input log from the simulation input log list ("YES" in step S407), the simulation part 14 applies an access content of the acquired input log (hereinafter called a "simulation input log") to the policy data 30a and determines whether to authorize (permit) the access to the access target (i.e., resources) (step S408). More specifically, the simulation part 14 specifies an access control entry (i.e., ACE element) corresponding to a resource name and an access process of the simulation input log. The simulation part 14 determines whether to authorize (permit) the access to the access target based on a value of the "Control" element contained in the "Action" element corresponding to the access type and access ID of the simulation input log within the specified access control entry.

Subsequently, the simulation part 14 generates an output log containing the access content and access authorization determination result (i.e., the access result) of the simulation input log in the format illustrated in FIG. 6B, and then outputs (records) the generated output login the output log file 43 (step S409). The values of the simulation input log are copied in the items of the resource name, the access type, the access ID and the access process of the output log. Current date and time may be recorded in the date and time item of the output log, or the value of simulation input log may be copied in the date and time item of the output log. The policy ID of the access control entry to which the determination result obtained in step S408 is applied is recorded as the policy ID of the output log. Thus, the output log generated by the simulation part 14 constantly contains the policy ID.

Subsequently, the simulation part 14 registers (records) a line number associated with the output log in the log index 17 (step S410). Note that any information, other than the line number, capable of uniquely identifying each of the output logs may be registered as an identifier of the output log in the log index 17.

In this embodiment, the log index 17 includes four subindices (i.e., tables). FIG. 12 is a diagram illustrating a configuration example of the log index 17 according to the embodiment.

In FIG. 12, a resource index 17a, a user index 17b, a group index 17c and a policy index 17d are illustrated as the subindices constituting the log index 17.

The resource index 17a records a line number of an output log containing the resource name for each resource name. The user index 17b records a line number of an output log containing the user ID as the access ID for each user ID. The group index 17c records a line number of an output log containing the group ID as the access ID for each group ID. The policy index 17d records a line number of an output log containing the policy ID for each policy ID.

Thus, the log index 17 fundamentally serves as a storage unit configured to store associated information between the output log and the access target or the access agent. That is, the resource index 17a records associated information between the output log and the access target, while the user index 17b or the group index 17c records associated information between the output log and the access agent. Note that if the access control entry to be applied is uniquely specified based on the access target and the access agent, the policy index 17d may not be generated. That is, the policy index 17d fundamentally serves as a storage unit configured to store associated information between the output log and a combination of the access target and the access agent.

Note that each of the resource index 17a, the user index 17b, the group index 17c and the policy index 17d is associated with the output log file 43, and the associated information is generated in the auxiliary storage 102 or the memory device 103.

Thus, in step S410, the simulation part 14 additionally registers the line number of the output log (output order of the logs) corresponding to the resource name, the user ID or group ID, and the policy ID contained in the output log. If the log index 17 is not generated for the output log file 43 currently to be processed, the simulation part 14 generates each of the above four indices 17a to 17d in the auxiliary storage 102 or the memory device 103 by associating a corresponding one of the indices 17a to 17d with the output log file 43. Further, if no record is found in a corresponding one of the indices of the resource name, the user ID or group ID and the policy ID, the simulation part 14 adds a new record for the corresponding one of the indices.

Note that if there is no overlap between the user ID and the group ID, the user index 17b and the group index 17c may be combined (integrated) into one index.

After the above-described steps S406 to S410 are carried out on all the simulation input logs contained in the simulation input log list ("NO" in step S407), the process of FIG. 11 is terminated. Note that details of steps S401 to S404 are described later.

Figure 13:
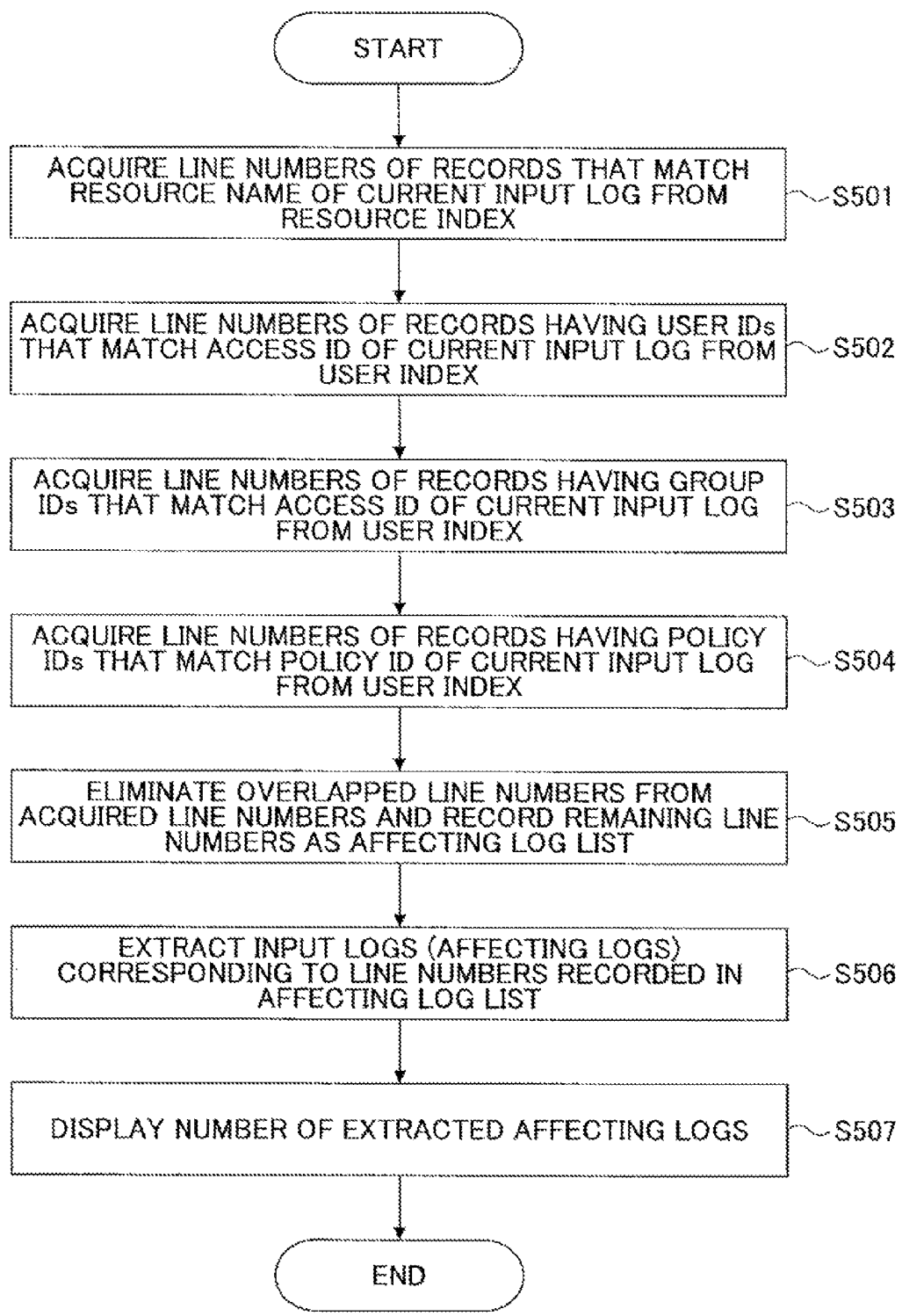
FIG. 13 is a flowchart illustrating an example of an affecting log searching process.

Next, a detail of step S105 in FIG. 4 is described. FIG. 13 is a flowchart illustrating an example of an affecting log searching process. Note that the process of FIG. 13 is effective after at least one simulation (step S107) is conducted. Thus, the input log file 42 utilized for carrying out the process of FIG. 13 is the output log file 43 that is output during the simulation carried out before the process of FIG. 13 is carried out.

In step S501, the affecting log search part 12 acquires from the resource index 17a all the line numbers contained in the records associated with all the resource names, which at least match part of the resource name contained in the input log (i.e., current input log) changed (edited) in step S102. That is, the input logs associated with the resource names, which at least match part of the resource name contained in the current input log, are specified in step S501. Regular expressions may be utilized for specifying the input logs associated with the resource names that at least match part of the resource name contained in the current input log. If the resource name contained in the current input log is a changed (edited) item, the affecting log search part 12 acquires from the resource index 17a all the line numbers corresponding to records associated with the resource names before the change (edition), and records associated with the changed (edited) resource names.

Subsequently, the affecting log search part 12 acquires from the user index 17b all the line numbers corresponding to records associated with the user IDs that match the access ID contained in the current input log(step S502). If the access ID is a changed (edited) item of the current input log, the affecting log search part 12 acquires from the user index 17b all the line numbers corresponding to records having the user IDs associated with the access ID before the change (edition) and records associated with the changed (edited) access ID. That is, the input logs associated with the user IDs that match the access ID contained in the current input log are specified in step S502. Note that if the access ID contained in the current input log is the group ID, step S502 may not be conducted.

Subsequently, the affecting log search part 12 acquires from the group index 17c all the line numbers corresponding to records associated with the group IDs that match the access ID contained in the current input log(step S503). If the access ID is a changed (edited) item of the current input log, the affecting log search part 12 acquires from the group index 17c all the line numbers corresponding to records having the group IDs associated with the access ID before the change (edition) and records associated with the changed (edited) access ID. Note that if the access ID contained in the current input log is the user ID, step S503 may not be conducted.

Subsequently, the affecting log search part 12 acquires from the policy index 17d all the line numbers corresponding to records associated with the policy IDs that match the policy ID contained in the current input log (step S504).

Subsequently, the affecting log search part 12 removes (eliminates) overlapped line numbers acquired in steps S501 to S505, and then records a collection of the remaining line numbers obtained after the elimination of the overlapped line numbers as an affecting log list in the memory device 103 (step S505). That is, the affecting log list indicates a collection of line numbers of the input logs that are liable to be adversely affected by the change of the current input log. More specifically, the affecting log list indicates a collection of line numbers of the input logs, access results of which are liable to be changed due to the change of the current input log.

Subsequently, the affecting log search part 12 extracts from the input log file 42 the input logs (i.e., affecting logs) corresponding to the line numbers recorded in the affecting log list, and records the extracted affecting logs in the memory device 103 (step S506).

Subsequently, the affecting log search part 12 displays the number of extracted affecting logs in the affecting log display area 513 of the log editor screen 510 (step S507). The affecting log display area 513 of FIG. 5 illustrates a displayed status of step S507 where the number of extracted affecting logs is displayed. Note that when a list display button 513 is clicked, the affecting log search part 12 displays a list of affecting logs in the affecting log display area 513 of the log editor screen 510.

As described above, searching for the affecting logs utilizing the log index 17 may be far faster than simply searching for the input log file 42 containing vast number of lines. Further, since the affecting logs are referable, possible affecting areas due to the change (edition) in the input log may be easily detected. That is, since the contents of the definitions of the policy data 30 tend to be highly complicated, unexpected areas may be adversely affected by the change in a part of the log. However, in this embodiment, this kind of unexpected affecting area due to the change in the log may be detected in advance as affecting logs, and hence the change in the log may be corrected for not affecting such a detected area.

Note that the log editor 11 may display the affecting log, which is selected in the affecting log display area 513, in the log editor area 512 of the log editor screen 510. In this case, the selected affecting log may be immediately edited in the log editor area 512.

In a case where the affecting log list is generated as above, steps S401 to S404 of the simulation process illustrated in FIG. 11 are carried out. Details of steps S401 to S404 are described as follows.

In this case, if the affecting log list is generated ("YES" in step S401), step S402 is performed. In step S402, the simulation part 14 acquires one of the line numbers from the affecting log list (step S402). Subsequently, the simulation part 14 determines whether the input log file 42 contains an input log associated with the acquired line number (step S403). If the input log file 42 contains the input log corresponding to the acquired line number ("YES" in step S403), the simulation part 14 acquires the input log corresponding to the acquired line number from the input log file 42 and adds the acquired input log to the simulation input log list (step S404).

If steps S401 to S404 are carried out for all the line numbers contained in the affecting log list ("NO" in step S403), steps S406 to S410 are carried out.

In this case, it is expected that the number of simulation input logs subject to simulation be significantly reduced. That is, the access log file 41 (see FIG. 1) generally contains avast number of lines of access logs and hence, a considerably long time may be required for simulating all the access logs. However, if the number of access logs subject to simulation is limited to the range of the access logs (input logs) listed in the affecting log list as illustrated in FIG. 11, it is expected that overall performance of the simulation process of FIG. 11 be significantly improved.

Note that if the simulation input logs are utilized as the affecting logs, the line corresponding to the line number of the current input log generated in the output log file 43 by the previous simulation is overwritten in step S409. Further, the line number recorded in step S410 indicates not the order of the input logs subject to simulation in the simulation input log list but the initial line numbers of the input logs. That is, the line numbers of the input logs utilized for acquiring the affecting logs in step S404.

Next, a detail of step S107 in FIG. 4 is described. The difference extracting part 16 displays an extracted difference between the output log file 43 generated by the simulation process of FIG. 11 and the input log file 42 on a difference display screen illustrated in FIG. 14.

FIG. 14 is a diagram illustrating a display example of the difference display screen 520. As illustrated in FIG. 14, the difference display screen 520 includes an input log display area 521, an output log display area 522 and a difference display area 523.

The input log display area 521 displays a list of input logs that are at least partially different from the output logs of the same line numbers. The output log display area 522 displays a list of output logs that are at least partially different from the input logs of the same line numbers. Note that the input log and the output log that have an identical line number are respectively displayed in the input log display area 521 and the output log display area 523 such that a relationship between the input log and the output log is clearly demonstrated. For example, the input log and the output log that have the identical line number may be respectively displayed at the same display positions (e.g., at the same height) in the input log display area 521 and the output log display area 523. Alternatively, the input log and the output log that have the identical line number may be respectively displayed with graphics such as connecting lines connecting the input log to the corresponding output log.

Specifically, if one of the input log or output log is selected in a corresponding one of the input log display area 521 and the output log display area 522, the difference extracting part 16 displays the input log and output log associated with the line number of the selected one of the input log and output log, such that the input log and output log are arranged in a vertical direction in the input log display area 521 and the output log display area 522. At this time, the difference extracting part 16 headlights the difference between the input log and the output log for emphasis. In FIG. 14, the difference between the input log and the output log is highlighted by enclosing the difference with a rectangular box 513r in the difference display area 523. Note that FIG. 14 illustrates an example in which the date and time of the output log is a copy of the value of the input log. Even if the date and time obtained when the simulation is carried out are recorded as the date and time of the output log, the difference in the date and time between the input log and the output log may not be treated as the difference. That is, the difference in the date and time between the input log and the output log may be ignored. In addition, the difference in the policy ID between the input log and the output log may also be ignored.

In this embodiment, the user determines whether the policy data 30a are valid by referring to the difference display screen 520. That is, the user determines whether a desired access control is performed (desired access result is obtained) by browsing the difference display screen 520. The user inputs an expected result for each of the input logs in the log editor screen 510. However, an obtained overall access result based on the updated policy data 30a updated by applying the expected results may not necessarily be desirable for the user. For example, an access control entry that authorizes access to all the files under a certain folder and an access control entry that rejects access to a specific file under the same folder may be simultaneously set within the same policy data 30a. In this case, an access result for the access to the specific file may vary with an evaluation order of the access control entries.

If the policy data 30a is formed of a collection of access control entries as demonstrated in this embodiment, it may be difficult to compute an effect caused by a change in one of the access control entries in advance. Accordingly, it is desirable to conduct a test in the practical operating environment as to whether the change results in the desired access result. However, such a test may need a vast number of testing hours.

In this embodiment, the access control is simulated based on the changed (edited) policy data 30a by utilizing the input log file 42 formed of a collection of access logs under the practical operation. Accordingly, the access result similar to the access result obtained from the test under the practical operating environment may be obtained in a short time.

As described above, in the policy editing support device 10 according to the embodiment, a burden of an editing task of the policy data 30a may be lowered. That is, the policy editing support device 10 may streamline the editing task of the policy data 30a.

Further, in the policy editing support device 10 according to the embodiment, since the user does not directly edit the policy data 30, inappropriate settings due to the user's inputting errors may be eliminated.

In addition, in this embodiment, the policy data 30 that satisfies longstanding policy setting requirements may be generated by updating the policy data utilizing the access log file 41 containing the old access logs and the latest access logs. As a result, some of the setting requirements missed out in the past may be set in the policy editing support device 10 according to the embodiment, and hence, degradation of access control setting due to the change may be prevented.

Further, the access control simulation utilizing vast number of access logs may, though faster than tested by human, still take a considerably long time. In this embodiment, the access control simulation is conducted based on a limited range of liable affecting logs due to the change in the input log. Accordingly, the access control simulation may be conducted at a higher speed.

In addition, in this embodiment, the log index 17 is generated and the affecting range of the logs is specified by utilizing the generated log index 17. Accordingly, the affecting range of the logs may be detected at a higher speed.

Note that in the descriptions of the above embodiments, the log index 17 is not generated under the normal operation. However, the log index 17 may be generated when the log output part 223 records (outputs) the access log in the access log file 41. In this case, the policy editing support device 10 may carry out step S105 illustrated in FIG. 4 to present the affecting logs from the first editing of the access log file 41. Moreover, the access control simulation may be conducted at a higher speed from the first access control simulation by utilizing the log index 17.

Further, in the descriptions of the above embodiments, the log editor 11 displays the log editor screen for the user to edit the input log, and the policy change part 13 updates the policy data 30a based on the edited input log. However, the input log file may be edited by utilizing a general text editor. In this case, the policy change part may determine changed parts (items) by comparing the previous log file 42 (i.e., input log file before the edition (change)) and the edited (changed) input log file 42. The policy change part 13 simultaneously carries out the policy updating process illustrated in FIG. 9 on the edited (changed) items of the input log file 42.

Moreover, in this embodiment, the access log file 41 is described as one file for convenience of illustration. However, the access log file 41 may include a vast number of access logs. Thus, in the practical operation, the access logs may be recorded in a different file per day. That is, the access log file 41 may be managed in separately divided files. In this case, each access log(i.e., each input log) may be identified by a combination of identification information (e.g., a file name) of the file recording the input logs and identification information (e.g., line number) contained in the file recording the input logs. For example, the log index 17 may include combinations of the file names and the line numbers.

Further, in the descriptions of the above embodiments, the policy ID may be recorded in the output log. The recording of the policy ID in the output log is a technique for accelerating step S302 of the policy data updating process illustrated in FIG. 9. That is, the recording of the policy ID in the output log may not be an essential requirement in the embodiments. Accordingly, the policy ID may not be recorded in the output log. In this case, step S304 of the policy data updating process illustrated in FIG. 9 is constantly carried out. In step S304, a new access entry is generated. However, the access control entry corresponding to the previous input log may be specified, and the specified access control entry may be changed based on the change in the input log(current input log). In this case, virtually the same processes as steps S302 and 303 may be carried out.

According to the above-described embodiments, a burden of the editing task of the access control data may be reduced.

The embodiments described so far are not limited thereto. Various modifications or alterations may be made within the scope of the inventions described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory recording medium storing therein an access control support program that causes a computer to execute a process, the process comprising:

inputting edited log information that is an edited version of original log information, the original log information including first access information of an access attempt to an access target, an authorization result for the access attempt, and a first entry ID of an access control entry in access control data, the authorization result being obtained based on the access control entry in the access control data and the first access information, and the first entry ID corresponding to the access control entry;

changing the access control data based on the edited log information;

performing an access authorization process by applying the changed access control data to the first access information; and generating result information that includes an authorization result of the access authorization process, second access information, and a second entry ID of an access control entry in the changed access control data the second access information being obtained by applying the changed access control data to the first access information, the authorization result of the access authorization process being obtained based on the access control entry in the changed access control data, and the second entry ID corresponding to the access control entry in the changed access control data, wherein the authorization result indicates whether the access attempt to the access target has been permitted or denied; and wherein in the edited log information, at least one of the first access information and the authorization result is changed from the original log information.

2. The recording medium as claimed in claim 1, wherein the process further comprises:

extracting a difference between the original log information and the result information; and outputting the extracted difference.

3. The recording medium as claimed in claim 1, wherein the process further comprises:

storing, in an index storage, information on the access target and an access agent in association with the first access information, and applying, by utilizing the index storage, the changed access control data to the second access information that includes one of the access target and the access agent identical to a corresponding one of the access target and the access agent in the first access information.

4. The recording medium as claimed in claim 3, wherein the process further comprises recording the information stored in the index storage for each of items of the result information.

5. The recording medium as claimed in claim 3, wherein the process further comprises:

specifying, by utilizing the index storage, the second access information having one of the access target and the access agent identical to the corresponding one of the access target and the access agent of the first access information; and outputting the specified second access information.

6. The recording medium as claimed in claim 1, wherein the process further comprises:

receiving a change in the second access information; and changing the access control data based on the change in the second access information.

7. An access control support device, comprising:

a processor to execute a process, the process comprising:

inputting edited log information that is an edited version of original log information, the original log information including first access information of an access attempt to an access target, an authorization result for the access attempt, and a first entry ID of an access control entry in access control data, the authorization result being obtained based on the access control entry in the access control data and the first access information, and the first entry ID corresponding to the access control entry;

changing the access control data based on the edited log information;

performing an access authorization process by applying the changed access control data to the first access information; and generating result information that includes an authorization result of the access authorization process, second access information, and a second entry ID of an access control entry in the changed access control data, the second access information being obtained by applying the changed access control data to the first access information, the authorization result of the access authorization process being obtained based on the access control entry in the changed access control data, and the second entry ID corresponding to the access control entry in the changed access control data, wherein the authorization result indicates whether the access attempt to the access target has been permitted or denied; and wherein in the edited log information, at least one of the first access information and the authorization result is changed from the original log information.

8. The access control support device as claimed in claim 7, wherein the process further comprises:

extracting a difference between the original log information and the result information; and outputting the extracted difference.

9. The access control support device as claimed in claim 7, wherein the process further comprises:

storing, in an index storage, information on the access target and an access agent in association with the first access information, and applying, by utilizing the index storage, the changed access control data to the second access information that includes one of the access target and the access agent identical to a corresponding one of the access target and the access agent in the first access information.

10. The access control support device as claimed in claim 9, wherein the process further comprises recording the information stored in the index storage for each of items of the result information.

11. The access control support device as claimed in claim 9, wherein the process further comprises:

specifying, by utilizing the index storage, the second access information having one of the access target and the access agent identical to the corresponding one of the access target and the access agent of the first access information; and outputting the specified second access information.

12. The access control support device as claimed in claim 7, wherein the process further comprises:

receiving a change in the second access information; and changing the access control data based on the change in the second access information.

13. A method of supporting access control executed by a computer, the method comprising:
inputting edited log information that is an edited version of original log information, the original log information including first access information of an access attempt to an access target, an authorization result for the access attempt, and a first entry ID of an access control entry in access control data, the authorization result being obtained based on the access control entry in the access control data and the first access information, and the first entry ID corresponding to the access control entry;
changing the access control data based on the edited log information;
performing an access authorization process by applying the changed access control data to the first access information; and
generating result information that includes an authorization result of the access authorization process, second access information, and a second entry ID of an access control entry in the changed access control data the second access information being obtained by applying the changed access control data to the first access information, the authorization result of the access authorization process being obtained based on the access control entry in the changed access control data, and the second entry ID corresponding to the access control entry in the changed access control data,
wherein the authorization result indicates whether the access attempt to the access target has been permitted or denied; and
wherein in the edited log information, at least one of the first access information and the authorization result is changed from the original log information.

14. The method as claimed in claim 13, further comprising:
extracting a difference between the original log information and the result information; and
outputting the extracted difference.

15. The method as claimed in claim 13, further comprising:
storing, in an index storage, information on the access target and an access agent in association with the first access information, and
applying, by utilizing the index storage, the changed access control data to the second access information that includes one of the access target and the access agent identical to a corresponding one of the access target and the access agent in the first access information.

16. The method as claimed in claim 15, further comprising recording the information stored in the index storage for each of items of the result information.

17. The method as claimed in claim 15, further comprising:
specifying, by utilizing the index storage, the second access information having one of the access target and the access agent identical to the corresponding one of the access target and the access agent of the first access information; and
outputting the specified second access information.

18. The method as claimed in claim 13, further comprising:
receiving a change in the second access information; and
changing the access control data based on the change in the second access information.

* * * * *